United States Patent
Jepsen et al.

(10) Patent No.: US 9,888,303 B1
(45) Date of Patent: Feb. 6, 2018

(54) LINEARIZATION OF PHOTONIC ANALOG-DIGITAL CONVERTER (PADC) SYSTEM BASED ON MULTI-DIMENSIONAL QUANTIZATION (MDQ)

(71) Applicant: Rockwell Collins, Inc., Cedar Rapids, IA (US)

(72) Inventors: Kim S. Jepsen, Ellicott City, MD (US); Wenlu Chen, Clarksville, MD (US); Raymond Zanoni, Marion, IA (US); Mark A. Laliberte, Annapolis, MD (US); Oliver S. King, Frederick, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/380,953

(22) Filed: Dec. 15, 2016

(51) Int. Cl.
| | |
|---|---|
| *H04B 10/58* | (2013.01) |
| *H04Q 11/00* | (2006.01) |
| *H04B 10/54* | (2013.01) |
| *H04B 10/556* | (2013.01) |

(52) U.S. Cl.
CPC ....... *H04Q 11/0066* (2013.01); *H04B 10/541* (2013.01); *H04B 10/5561* (2013.01); *H04B 10/58* (2013.01); *H04B 2210/252* (2013.01); *H04Q 2011/0073* (2013.01)

(58) Field of Classification Search
CPC ........ H04Q 11/0066; H04Q 2011/0073; H04B 10/541; H04B 10/5561; H04B 10/58; H04B 2210/252
See application file for complete search history.

(56) References Cited

U.S. PATENT DOCUMENTS

| | | |
|---|---|---|
| 7,868,799 B1 | 1/2011 | Price et al. |
| 7,876,246 B1 | 1/2011 | Price et al. |
| 8,442,402 B1 | 5/2013 | Zanoni et al. |
| 8,446,305 B1 | 5/2013 | Zanoni et al. |
| 8,456,336 B1 | 6/2013 | Zanoni et al. |
| 8,548,331 B1 | 10/2013 | Zanoni et al. |
| 8,779,955 B1 | 7/2014 | Zanoni et al. |
| 8,928,510 B1 | 1/2015 | Zanoni et al. |
| 8,965,211 B1 | 2/2015 | Zanoni et al. |
| 9,197,471 B1 | 11/2015 | Zanoni et al. |
| 9,356,704 B1 | 5/2016 | Zanoni et al. |
| 9,553,754 B1* | 1/2017 | Dorosenco .......... H04L 27/3411 |

(Continued)

*Primary Examiner* — Shi K Li
*Assistant Examiner* — Mina Shalaby
(74) *Attorney, Agent, or Firm* — Angel N. Gerdzhikov; Donna P. Suchy; Daniel M. Barbieri

(57) ABSTRACT

A method and related system for linearizing a photonic ADC sampling system of an ELINT receiver includes modulating optical pulse trains of varied pulse amplitudes based on a generated ramped-voltage calibration signal. The modulated pulse trains are demodulated into I/Q components to generate signal constellations. Equivoltage radials are defined by points of the signal constellations sharing a common calibration voltage and a common phase angle of the modulator. A lookup table is generated by mapping the signal constellations and equivoltage radials to a coordinate system to determine, for each coordinate bin, a corresponding pulse amplitude and phase angle. The generated lookup table may be used to correct nonlinear distortions in recovered output signals, preserving high-ENOB performance and increasing the dynamic range of the receiver.

20 Claims, 9 Drawing Sheets

(56) References Cited

U.S. PATENT DOCUMENTS

| | | | |
|---|---|---|---|
| 2013/0308718 A1* | 11/2013 | Hansen | H04L 25/0228 375/295 |
| 2015/0086216 A1* | 3/2015 | Xie | H04B 10/54 398/186 |
| 2016/0178987 A1* | 6/2016 | Taylor | H04B 10/66 359/108 |
| 2016/0181979 A1* | 6/2016 | Taylor | H03B 17/00 327/157 |
| 2016/0182024 A1* | 6/2016 | Taylor | H03K 3/42 327/208 |
| 2016/0182155 A1* | 6/2016 | Taylor | H04B 10/615 398/208 |

* cited by examiner

200

202 — Generating, via a waveform generator of a pADC system, at least one calibration signal corresponding to a sequence of calibration voltages 204 — Generating, via an optical pulse source of the pADC system, at least one optical pulse train associated with a pulse amplitude 206 — Imparting voltage information of the at least one calibration signal onto the at least one optical pulse train via a phase modulator of the pADC system 208 — Generating, via quantization circuitry of the pADC system, at least one first signal constellation in a multidimensional coordinate space by demodulating the at least one phase-modulated optical pulse train 210 — Defining, via a processor of the pADC system, one or more equivoltage radials, each equivoltage radial comprising one or more points of the at least one first signal constellation, the one or more points associated with at least one of a) a first calibration voltage of the sequence of calibration voltages and b) a first phase angle of the phase modulator 212 — Generating, via the processor, at least one lookup table corresponding to the multidimensional coordinate space by mapping the one or more equivoltage radials to an ordered plurality of coordinate bins

214 — Via the processor, associating with each coordinate bin of the ordered plurality of coordinate bins at least one of a pulse amplitude of the optical pulse source and a second phase angle of the phase modulator, based on the one or more equivoltage radials and the at least one first signal constellation 216 — Receiving, via the pADC system, at least one input signal 218 — Imparting voltage information of the at least one input signal onto the at least one optical pulse train via the phase modulator 220 — Generating, via the quantization circuitry, at least one second signal constellation corresponding to the at least one input signal by demodulating the at least one phase-modulated optical pulse train 222 — Generating, via the processor, at least one digital output signal based on the at least one second signal constellation 224 — Correcting the at least one digital output signal based on the at least one lookup table

*FIG. 4B*

LINEARIZATION OF PHOTONIC ANALOG-DIGITAL CONVERTER (PADC) SYSTEM BASED ON MULTI-DIMENSIONAL QUANTIZATION (MDQ)

GOVERNMENT LICENSE RIGHTS

This invention was made with government support under Government Contract No. HR0011-10-C-0062, REMOTED ANALOG-TO-DIGITAL CONVERTER WITH DE-SERIALIZATION AND RECONSTRUCTION (RADER), awarded by the Defense Advanced Research Projects Agency (DARPA). The government has certain rights in the invention.

BACKGROUND

Receiver systems for electronic intelligence (ELINT) applications may sample and digitize a multiple-GHz analog signal via a photonic analog to digital converter (pADC), which samples the input signal via a highly stable optical pulse train generated by a mode-locked laser (MLL) or similar optical pulse source. pADC systems incorporating, for example, multi-dimensional quantization (MDQ) or multi-phase quantization (MPQ) may significantly enhance the dynamic range of the receiver system, both in terms of high effective number of bits (ENOB) and low distortion levels. However, nonlinear distortions may limit both the ENOB and the spurious free dynamic range (SPDR) of the receiver system.

SUMMARY

Embodiments of the inventive concepts disclosed herein are directed to a system and related method for linearization, or linear calibration, of a photonic analog to digital conversion (pADC) sampling system. Linearization of the pADC system may provide highly accurate calibration and correction of nonlinear behaviors and a correspondingly accurate recovered signal.

In one aspect, embodiments of the inventive concepts disclosed herein are directed to a method for linearization of a pADC system. The method may include generating an input signal corresponding to a linear ramp of calibration voltages. The method may include generating a series of optical pulse trains, each optical pulse train having a discrete optical power level. The method may include imparting the voltage information of the input signal onto each optical pulse train via a phase modulator. The method may include generating a series of signal constellations in multidimensional space by demodulating the phase-modulated optical pulse trains. The method may include defining a series of equivoltage radials from the points of the signal constellations, where the points of each equivoltage radial correspond to a common calibration voltage and a common phase angle of the phase modulator. The method may include generating a multidimensional lookup table corresponding to the coordinate system of the signal constellations by mapping the equivoltage radials to a multidimensional array of coordinate bins, where each bin corresponds to at least a phase angle and an optical power level.

In a further aspect, embodiments of the inventive concepts disclosed herein are directed to a linearizing pADC sampling system. The system may include an optical pulse source for generating a series of optical pulse trains, each pulse train having a discrete optical power level. The system may include a waveform generator for generating an input signal corresponding to a ramped series of calibration voltages. The system may include a phase modulator for imparting the voltage information of the input signal onto the optical pulse trains. The system may include one or more quantizers for generating a series of multidimensional signal constellations by demodulating the optical pulse trains and recovering a digital output signal based on the signal constellations. The system may include processors configured to define a series of equivoltage radials from the points of the signal constellations, each equivoltage radial associated with a common phase angle of the phase modulator and a common calibration voltage. The processors may be configured to generate a multidimensional lookup table corresponding to the coordinate system of the signal constellations by mapping the equivoltage radials to a multidimensional array of coordinate bins, each coordinate bin corresponding to a phase angle and an optical power level.

In a still further aspect, embodiments of the inventive concepts disclosed herein are directed to an electronic intelligence (ELINT) receiver incorporating a linearizing pADC sampling system. The system may include an optical pulse source for generating a series of optical pulse trains, each pulse train having a discrete optical power level. The receiver may include a waveform generator for generating a calibration signal corresponding to a ramped series of calibration voltages. The receiver may include a phase modulator for imparting the voltage information of the signal onto the optical pulse trains, whether the signal is the calibration signal or a received analog input signal. The receiver may include one or more quantizers for generating a series of multidimensional signal constellations by demodulating the phase-modulated optical pulse trains and recovering a digital output signal based on the signal constellations. The receiver may include processors configured to define a series of equivoltage radials from the points of the signal constellations, each equivoltage radial associated with a common phase angle of the phase modulator and a common calibration voltage. The processors may be configured to generate a multidimensional lookup table corresponding to the coordinate system of the signal constellations by mapping the equivoltage radials to a multidimensional array of coordinate bins, each coordinate bin corresponding to a phase angle and an optical power level. The processors may correct a recovered digital output signal corresponding to the received input signal based on the generated lookup table.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIGS. 4A and 4B illustrate an exemplary embodiment of a method according to the inventive concepts disclosed herein.

DETAILED DESCRIPTION OF EXEMPLARY EMBODIMENTS

Figure 1:
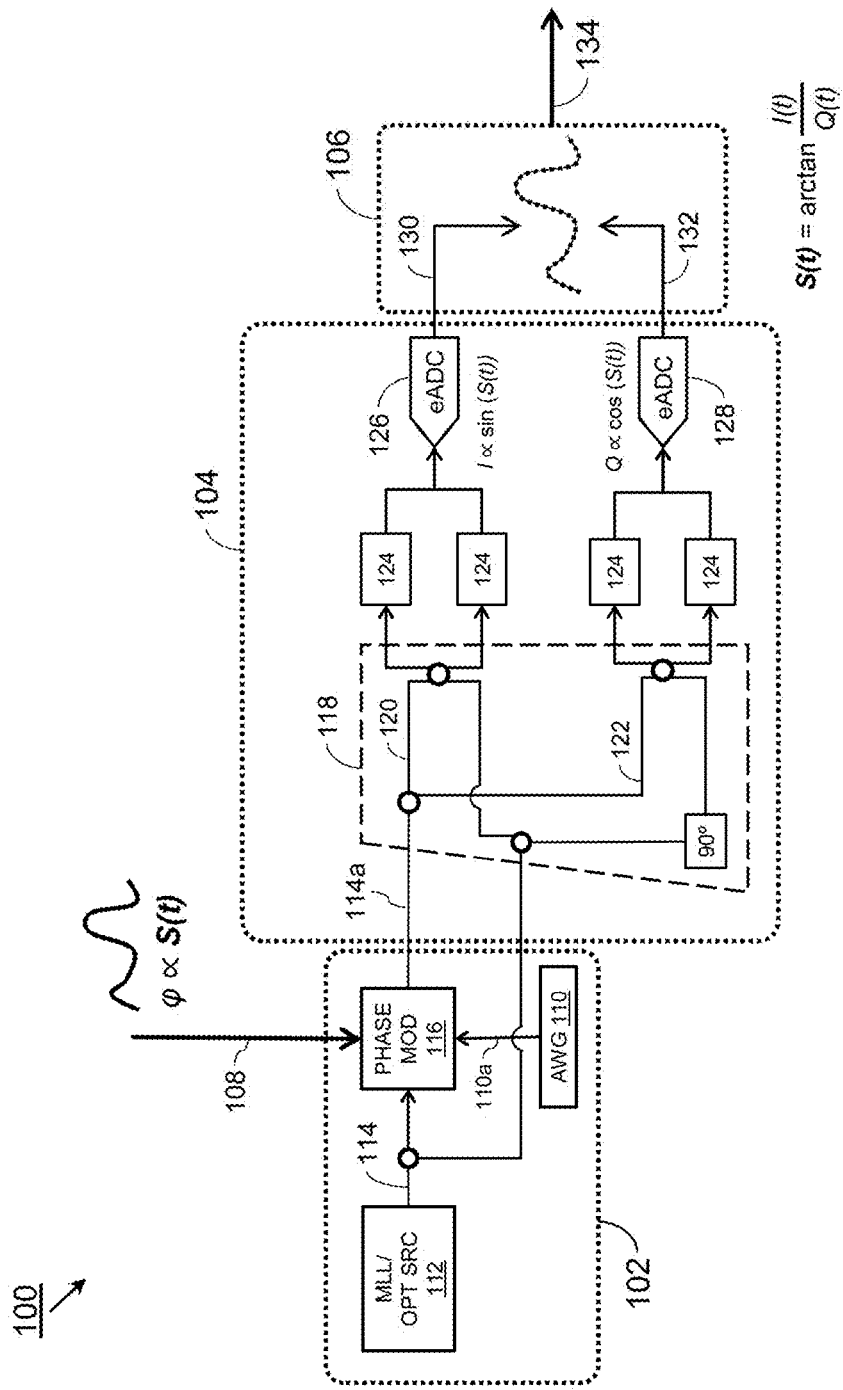
FIG. 1 illustrates an exemplary embodiment of a linearized pADC sampling system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and related methods for linearizing a pADC sampling system of an ELINT receiver, or calibrating the pADC system to correct nonlinearities in the recovered output signal corresponding to a digitization of the sampled input signal received by the ELINT receiver. Non-linear correction of the recovered output signal can significantly enhance both the linearity and noise performance of the ELINT receiver.

Referring to FIG. 1, an exemplary embodiment of a linearized pADC sampling system 100 according to the inventive concepts disclosed herein may include an optical subsystem 102, quantizing circuitry 104, and signal processors 106. The linearized pADC sampling system 100 may be embodied in an electronic intelligence (ELINT) receiver configured to receive an input signal 108 (e.g., an analog RF signal S(t)) to be sampled by the optical subsystem 102. For example, the optical subsystem 102 may include an arbitrary waveform generator 110 (AWG) for generating calibration signals (110a) and an optical pulse source 112 configured to emit an optical pulse train 114 (e.g., a stream of optical pulses). The optical subsystem 102 may include a phase modulator 116 configured to "sample" the received input signal 108 by modulating the optical pulse train 114 according to the input signal 108. For example, the received input signal 108 may induce rotation by a particular phase angle φ (e.g., between zero and 2π) in one or more dimensions (e.g., in phase or quadrature (e.g., I/Q space)), such that φ∝S(t). The optical subsystem 102 may include an amplitude modulator (not shown) for discriminating the number of 2π phase revolutions.

The quantizing circuitry 104 may include one or more demodulators 118 for extracting an I signal (120) and a Q signal (122), or respectively an in-phase component and a quadrature component, from the phase-modulated optical pulse train 114a. Balanced photodetectors (124) may determine a difference between the extracted I and Q signals and the optical pulse train 114. Electronic analog-to-digital converters 126, 128 (eADC) may respectively determine phase and quadrature (I/Q) coordinates 130, 132 by digitizing and/or quantizing the extracted I and Q signals 120, 122, such that I∝ sin (S(t)), Q∝ cos (S(t)). The resulting I/Q coordinates 130, 132 may be processed by the signal processors 106 (e.g., a field-programmable gated array (FPGA)) to recover an output signal S(t) (134) corresponding to a digitization of the analog input signal 108.

Figure 2A:
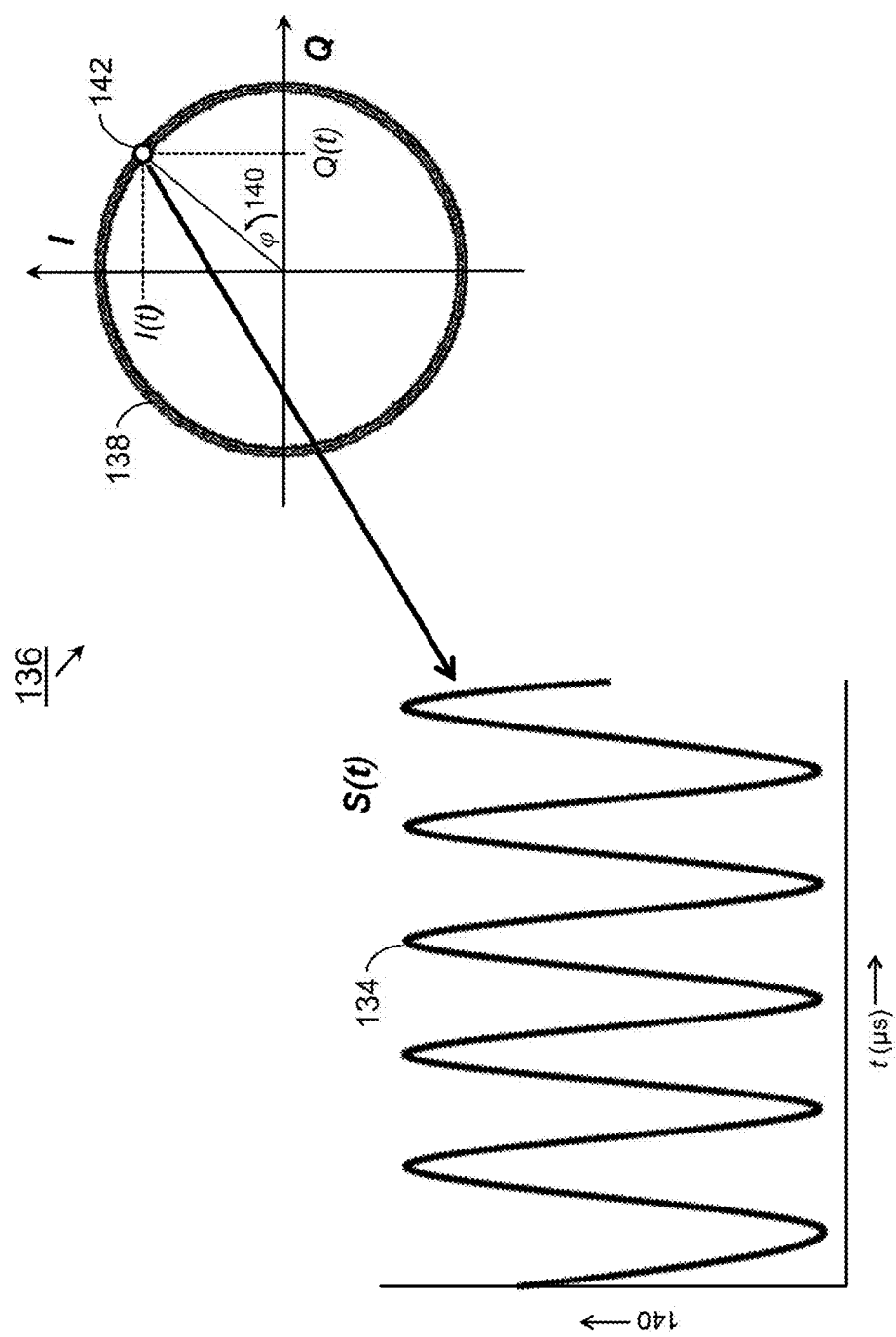
FIG. 2A illustrates a coordinate space associated with the system of FIG. 1.

Referring now to FIG. 2A, the coordinate space 136 may indicate the generation of a signal constellation 138, and the recovery of the output signal S(t) (134) therefrom, by the signal processors 106 of FIG. 1. For example, the signal processors 106 may recover the output signal 134 by determining changes in a recovered phase angle φ (140) over time (e.g., in μs) based on each digitized data point 142 in a signal constellation 138 corresponding to a particular optical power level (pulse amplitude) of the optical pulse train 114 (FIG. 1). The data point 142 (I(t), Q(t)) may define the phase angle φ (140) between zero and 2π at a point in time in terms of an I-axis coordinate I(t) and a Q-axis coordinate Q(t), the output signal S(t) (134) recoverable from the data points 142 of the signal constellation 138 by the process $$S(t) = \arctan\left(\frac{I(t)}{Q(t)}\right). \quad [1]$$

However, any nonlinear distortion of either the I-signal 120 or the Q-signal 122 (FIG. 1) may result in distortion of the output signal S(t) (134).

Figure 2B:
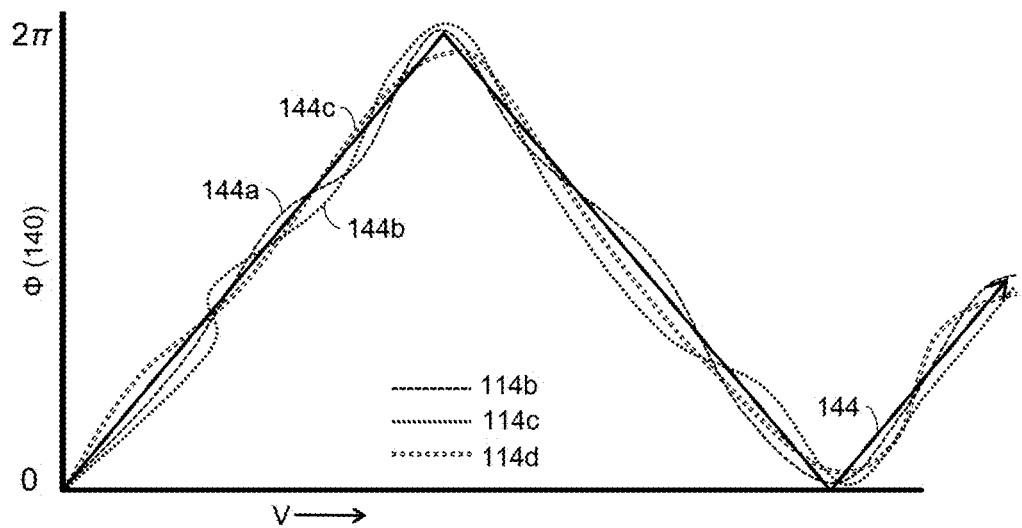
FIG. 2B illustrates a linear relationship of the system of FIG. 1.

Referring also to FIG. 2B, an ideal recovered signal (output signal 134, FIG. 2A) may be characterized by a linear relationship between the phase angle φ (140) and the ramp voltage associated with the optical power level of the optical pulse train 114 (FIG. 1); as the ramp voltage increases, the phase angle φ should increase (between 0 and 2π) in predictably linear fashion (144). However, recovery of the output signal 134 (FIG. 2A) may introduce nonlinear distortions 144*a-c*. Each individual nonlinear distortion 144*a*, 144*b*, 144*c* may respectively be associated with a particular phase amplitude 114*b*, 114*c*, 114*d* and describe a relationship between the phase angle φ (140) and the ramp voltage that diverges, or deviates, from the linear relationship 144.

Figure 2C:
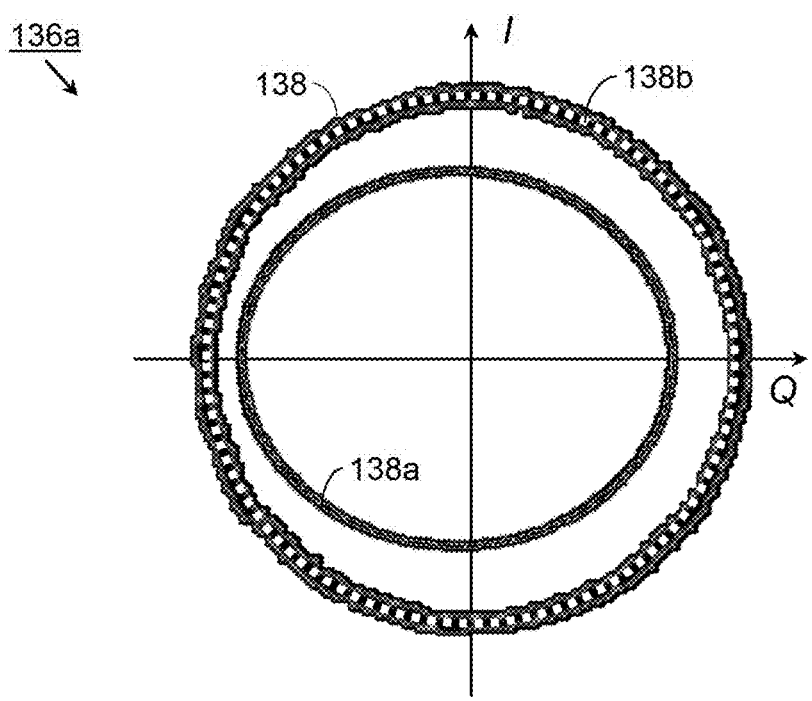
FIGS. 2C through 2F illustrate the coordinate space of FIG. 2A.

Referring also to FIG. 2C, the coordinate space 136*a* may be implemented and may function similarly to the coordinate space 136 of FIG. 2A, except that within the coordinate space 136*a*, the signal constellation 138*a* may incorporate distortions associated with recovery of the output signal 134 (FIG. 2A), and the signal constellation 138*b* (white dots) may be associated with an ideal recovered output signal (e.g., the linear relationship 144 of FIG. 2B, minimal distortion, maximal effective number of bits (ENOB), optimal spurious-free dynamic range (SFDR)). For example, the nonlinear distortions 144*a-c* (FIG. 2B) may result in distortions of the I-signal and Q-signal 120, 122 (FIG. 1) which, when the I-signal and Q-signal are quantized by the respective eADCs 126, 128 (FIG. 1), may distort the resulting signal constellation 138*a* associated with the recovered output signal 134 in either (or both) of the I and Q dimensions.

However, the nonlinear distortions 144*a-c*, and thus the recovered output signal 134, may be corrected through calibration of the pADC sampling system 100 (FIG. 1). Referring back to FIG. 1, the AWG 110 may generate a series of calibration signals 110*a*, each calibration signal being a fast linear voltage ramp through a series of discrete calibration voltages, each calibration voltage corresponding to a phase angle φ (140) between zero and 2π, as shown by FIG. 2B. The calibration signal 110*a* may then be injected into the phase modulator 116, which may impart the voltage information of the calibration signal 110*a* onto the optical pulse train 114 (generating the phase-modulated optical pulse train 114*a*).

Figure 2D:
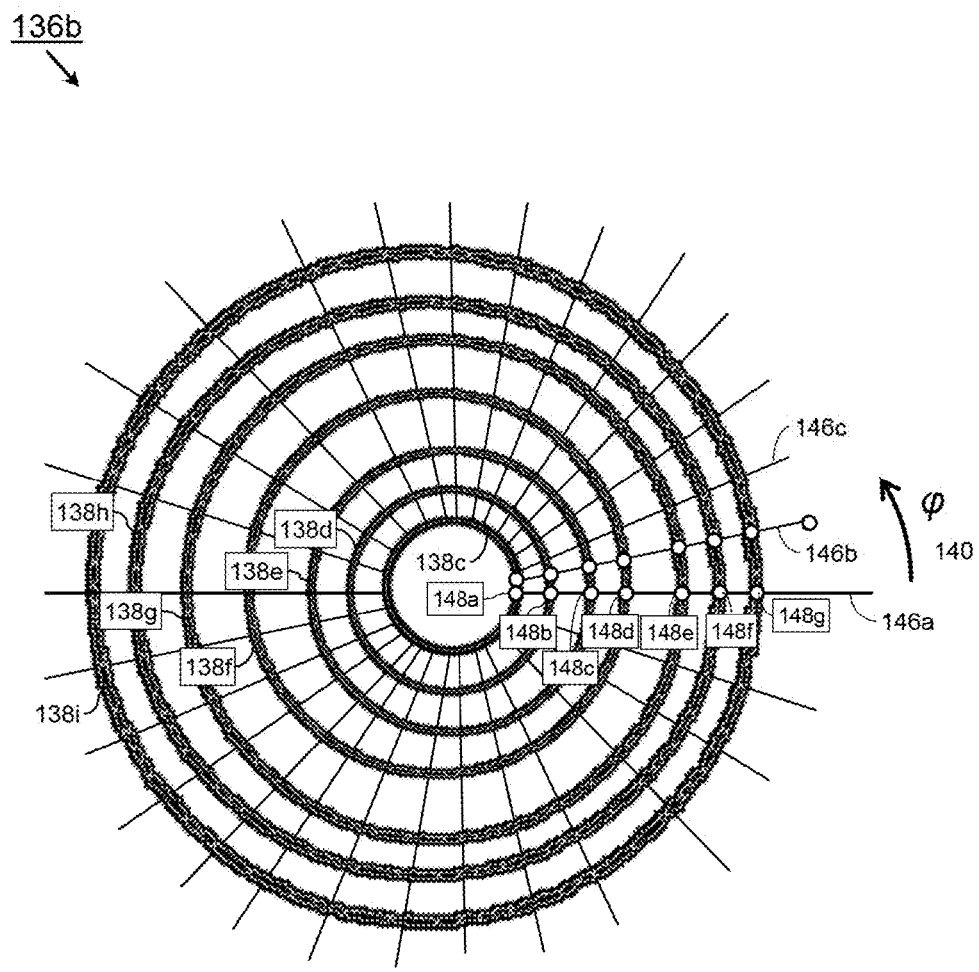

Referring to FIG. 2D, the coordinate space 136*b* may be implemented and may function similarly to the coordinate space 136 of FIG. 2A, except that the coordinate space 136*b* may include concentric calibration curves 138*c-i*, each calibration curve corresponding to a signal constellation generated at an increasing optical power level (pulse amplitude) of the optical pulse train 114 (FIG. 1). For example, the calibration curve 138*c* may be associated with a signal constellation generated by imparting the voltage information of the ramped calibration signal 110*a* onto an optical pulse train 114 at a power level of −22.28 dBm. (The precise power settings of the optical pulse train 114 are not critical, provided the power settings 1) are constant so as to provide clear basis for parametrization of equivoltage radials and 2) accurately reflect the constant optical power levels associated with actual use, e.g., with respect to receiving an input signal (108, FIG. 1) and modulating the optical pulse train 114 based on the received signal.) The resulting phase-modulated optical pulse train (114*a*) may be demodulated (via demodulator 118, FIG. 1) and the resulting in-phase and quadrature components (e.g., I- and Q-signals 120, 122) measured respectively by eADCs 126, 128 to model the calibration curve 138*c* in I/Q space. The optical power level may be set to −20.89 dBm (or any like power level clearly distinct from a previous setting) and the calibration signal 110*a* re-injected into the phase modulator 116 to generate a subsequent phase-modulated optical pulse train 114*a*, from which the calibration curve 138*d* may be modelled as described above. Each successive calibration curve 138*e-i* may reflect a discrete pulse amplitude setting.

Based on the generated calibration curves 138*c-i*, the signal processors 106 (FIG. 1) may determine a set of equivoltage radials 146*a*, 146*b*, 146*c*, . . . . Each equivoltage radial 146*a-c* may correspond to a well-defined calibration voltage (e.g., of the ramp voltage signal shown by FIG. 2B) and a phase angle φ (140) between zero and 2π. As shown by FIG. 2B, the phase angle φ (140) scales with the ramp voltage on a linear basis (144). Similarly, each equivoltage radial 146*a-c* may connect a series of points (148*a-g*) on each concentric calibration curve 138*c-i*, the series of points sharing a common calibration voltage and phase angle φ (140). For example, each equivoltage radial 146*a-c* may be determined by parametrizing the data points 148*a-g* and the calibration curves 138*c-i* using polar coordinates. An equivoltage radial may be expressible by a polynomial of variable order, e.g., the third-order polynomial $$D = a + bP + cP^2 + dP^3 \quad [2]$$

for the indicated phase angle D (φ, 140), the optical power level/phase amplitude P, and best-fit coefficients a, b, c, d. Generally, the lower the order of the polynomial, the better the averaging of any noise in the calibration process.

Figure 2E:
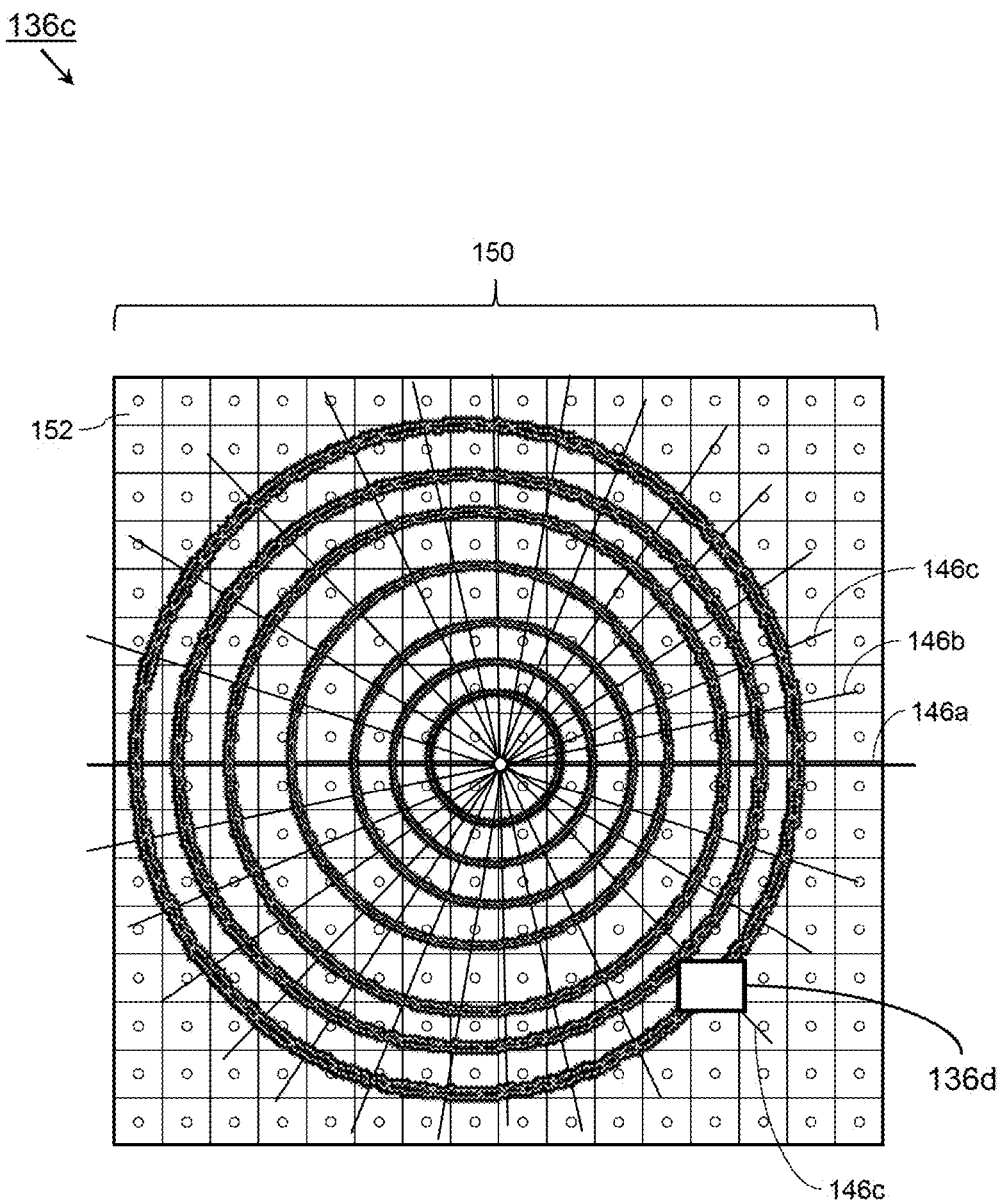

Referring to FIG. 2E, the coordinate space 136*c* may be implemented and may function similarly to the coordinate space 136*b* of FIG. 2D, except that the coordinate space 136*c* may indicate the mapping of the calibration curves 138*c-i* (FIG. 2D) and equivoltage radials 146*a-c* to a multidimensional array 150 of coordinate bins 152. The multidimensional array 150 may correspond to the coordinate system (e.g., I/Q space) of the generated signal constellations 138, 138*a-b* (FIG. 2C) (and the calibration curves 138*c-i*). By mapping the calibration curves 138*c-i* and the equivoltage radials 146*a-c* to the multidimensional array 150, a corresponding phase angle φ (140, FIG. 2A) of the phase modulator 116 and optical power level (e.g., a power setting of the MLL 112 (FIG. 1) corresponding to a pulse amplitude of the optical pulse train 114 (FIG. 1)) may be interpolated for each coordinate bin 152 in the multidimensional array 150.

Figure 2F:
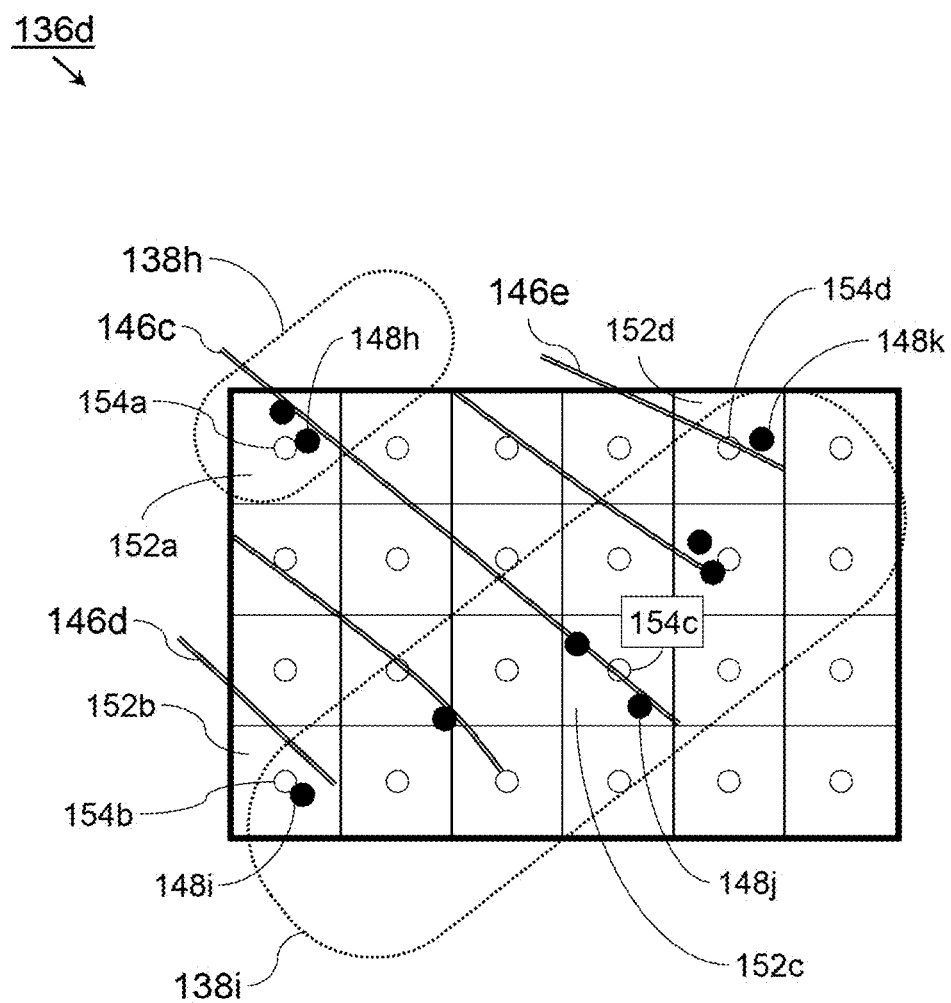

For example, referring also to FIG. 2F, the coordinate space 136*d* may correspond to an inset or subset of the coordinate space 136*c* of FIG. 2E. The coordinate space 136*d* may include a subset of coordinate bins 152*a-d*, each coordinate bin 152*a-d* having a center 154*a-d*. The corresponding phase angle φ (140, FIG. 2A) and pulse amplitude (optical power level) for each individual coordinate bin 152*a-d* may be interpolated by determining the proximate data point 148*h-k* closest to the center 154*a-d* of each coordinate bin 152*a-d*. For example, the data point 148*h* may be associated with the optical power level corresponding to the calibration curve 138*h* and the phase angle φ corresponding to the equivoltage radial 146*c*. Similarly, the data point 148*i* may be associated with the optical power level corresponding to the calibration curve 138*i* and the phase angle φ corresponding to the equivoltage radial 146*d*; the data point 148*j* may be associated with the optical power level corresponding to the calibration curve 138*i* and the phase angle φ corresponding to the equivoltage radial 146c; and the data point 148k may be associated with the optical power level corresponding to the calibration curve 138i and the phase angle φ corresponding to the equivoltage radial 146e.

Figure 3:
FIG. 3 illustrates a multidimensional lookup table generated by the system of FIG. 1.

Referring to FIG. 3, a multidimensional lookup table 156 may include multiple multidimensional arrays 150a-b, each individual coordinate bin array 150a-b including coordinate bins 152e-f corresponding to the coordinate space 136c of FIG. 2E and to a parameter determined by the interpolation process shown by FIG. 2F. For example, the coordinate bin array 150a may be a 256×256 array of coordinate bins 152e, each coordinate bin associated with an interpolated phase angle φ (140, FIG. 2A). Similarly, the coordinate bin array 150b may be a 256×256 array corresponding to the same coordinate space 136c, except that each coordinate bin 152f of the coordinate bin array 150b may be associated with a pulse amplitude setting corresponding to the interpolated optical power level.

Referring back to FIG. 1, the multidimensional lookup table 156 may be employed for correction of nonlinear errors in the digital output signals 134 recovered from analog input signals received by the pADC sampling system 100. For example, the phase modulator 116 may modulate the optical pulse train 114 according to the received analog input signal, and the resulting phase-modulated optical pulse train (114a) may be demodulated (via demodulator 118) into in-phase and quadrature components (I-signal 120, Q-signal 122) measured by the respective eADCs 126, 128 to model the signal constellation 138j in the coordinate space 136c, mapping the signal constellation 138j to the multidimensional lookup table 156 to determine the appropriate phase angle and pulse amplitude values for correction of the recovered output signal 134 based on the analog input signal.

Referring to FIGS. 4A and 4B, an exemplary embodiment of a method 200 for linearizing a photonic analog-digital converter (pADC) system according to the inventive concepts disclosed herein may be implemented by the pADC sampling system 100 of FIG. 1 in some embodiments, and may include one or more of the following steps.

Referring particularly to FIG. 4A, at a step 202, a waveform generator of a pADC sampling system generates a calibration signal comprising a sequence of calibration voltages. For example, the calibration signal may comprise a voltage ramp of calibration voltages, each calibration voltage corresponding to a phase angle between zero and 2π.

At a step 204, an optical subsystem of the pADC sampling system generates an optical pulse train associated with an optical pulse amplitude of the optical pulse source (e.g., a power level of the MLL).

At a step 206, a phase modulator of the pADC sampling system modulates the optical pulse train according to the generated calibration signal. For example, the optical pulse train may be modulated according to at least one phase angle corresponding to a calibration voltage of the calibration signal.

At a step 208, quantization circuitry of the pADC sampling system generates at least one signal constellation in multidimensional coordinate space, the signal constellation corresponding to the calibration signal, by demodulating the phase-modulated optical pulse train. For example, the signal constellation may be in I/Q space and generated by measuring a demodulated in-phase (I) component with a first electronic analog-digital converter (eADC) and measuring a demodulated quadrature (Q) component with a second eADC.

At a step 210, a signal processor of the pADC sampling system defines one or more equivoltage radials comprising a set of points of the generated signal constellations, each set of points associated with a common calibration voltage and a common phase angle of the phase modulator.

At a step 212, the signal processor generates a multidimensional lookup table corresponding to the coordinate space by mapping the signal constellations and the equivoltage radials to a multidimensional array of coordinate bins. For example, the lookup table may be a two-dimensional lookup table corresponding to I/Q space, each coordinate bin of the multidimensional array comprising a corresponding phase angle and a corresponding optical power level (pulse amplitude).

Referring in particular to FIG. 4B, at a step 214, the signal processor associates with each coordinate bin of the multidimensional array at least one of a) a pulse amplitude of the optical pulse source and a phase angle of the phase modulator, based on the mapped equivoltage radials and signal constellations. For example, the signal processor may identify a point (of a set of points defining each the equivoltage radials) closest to the center of the coordinate bin, and determine the pulse amplitude and phase angle corresponding to the identified point. The associated pulse amplitude may be the pulse amplitude associated with the particular signal constellation (calibration curve) including the identified point, and the associated phase angle may be the common phase angle corresponding to the equivoltage radial including the identified point (or to the phase angle corresponding to the common calibration voltage of the equivoltage radial).

The method 200 may include additional method steps 216 through 224. At the step 216, the pADC sampling system may be embodied in an ELINT receiver which receives an analog input signal.

At a step 218, the phase modulator modulates the optical pulse train generated by the optical subsystem based on the received analog input signal.

At a step 220, the quantization circuitry generates a signal constellation corresponding to the received analog input signal by demodulating the phase-modulated optical pulse train.

At a step 222, the signal processor generates a recovered digital output signal based on the generated signal constellation corresponding to the received analog input signal.

At the step 224, the signal processor corrects the recovered digital output signal based on the generated multidimensional lookup table.

As will be appreciated from the above, systems and methods according to embodiments of the inventive concepts disclosed herein may significantly enhance both the linearity and noise performance of an ELINT receiver incorporating the pADC sampling system. For example, testing of a pADC sampling system incorporating 6 SNOB electronic ADCs has shown an ideal performance of 7.65 SNOB and a SFDR of 70 dB. Uncorrected nonlinear behaviors may result in significantly degraded performance (5.32 SNOB, 37.0 dB at 5.1 SNOB). However, nonlinear correction based on the generated lookup table may restore performance to near-ideal levels (e.g., 7.31 SNOB, or 58.3 dB at 6.89 SNOB) and a recovered signal that suppresses noise peaks in the uncorrected signal.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A method for linearizing a photonic analog-digital converter (pADC) system, the method comprising:
   generating, via a waveform generator of a pADC system, at least one calibration signal comprising a sequence of calibration voltages;
   generating, via an optical pulse source of the pADC system, at least one optical pulse train associated with a pulse amplitude;
   imparting voltage information of the at least one calibration signal onto the at least one optical pulse train via a phase modulator of the pADC system;
   generating, via quantization circuitry of the pADC system, at least one first signal constellation in a multidimensional coordinate space by demodulating the at least one phase-modulated optical pulse train;
   defining, via a processor of the pADC system, one or more equivoltage radials, each equivoltage radial comprising one or more points of the at least one first signal constellation, the one or more points associated with at least one of a) a first calibration voltage of the sequence of calibration voltages and b) a first phase angle associated with the phase modulator;
   generating, via the processor, at least one lookup table corresponding to the multidimensional coordinate space by mapping the one or more equivoltage radials to an ordered plurality of coordinate bins; and
   via the processor, populating the at least one lookup table by associating with each coordinate bin of the ordered plurality of coordinate bins one or more of the at least one pulse amplitude and the at least one first phase angle, based on the one or more equivoltage radials and the at least one first signal constellation.

2. The method of claim 1, wherein generating, via a waveform generator of a pADC system, at least one calibration signal comprising a sequence of calibration voltages includes:
   generating, via a waveform generator of a pADC system, at least one ramp voltage signal comprising at least one calibration voltage of the sequence of calibration voltages.

3. The method of claim 1, wherein imparting voltage information of the at least one calibration signal onto the at least one optical pulse train via a phase modulator includes:
   modulating the at least one optical pulse train based on at least one second phase angle between zero and $2\pi$ radians, the second phase angle corresponding to at least one calibration voltage of the sequence of calibration voltages.

4. The method of claim 1, wherein generating, via quantization circuitry of the pADC system, at least one first signal constellation in a multidimensional coordinate space by demodulating the at least one phase-modulated optical pulse train includes:
   generating, via quantization circuitry of the pADC system, at least one first signal constellation in I/Q space by demodulating the at least one phase-modulated optical pulse train into at least an in-phase component and a quadrature component.

5. The method of claim 4, wherein generating, via quantization circuitry of the pADC system, at least one first signal constellation in I/Q space by demodulating the at least one phase-modulated optical pulse train into at least an in-phase component and a quadrature component includes:
   generating at least one first signal constellation in I/Q space by:
      digitizing the at least one in-phase component via at least one first analog-digital converter (ADC) of the pADC system; and
      digitizing the at least one quadrature component via at least one second ADC of the pADC system.

6. The method of claim 4, wherein generating, via the processor, at least one lookup table corresponding to the multidimensional coordinate space by mapping the one or more equivoltage radials to an ordered plurality of coordinate bins includes:
   generating, via the processor, at least one lookup table corresponding to I/Q space by mapping the one or more equivoltage radials to an ordered plurality of two-dimensional coordinate bins, each coordinate bin corresponding to a set of I/Q coordinates.

7. The method of claim 1, wherein via the processor, populating the at least one lookup table by associating with each coordinate bin of the ordered plurality of coordinate bins one or more of the at least one pulse amplitude and the at least one first phase angle, based on the one or more equivoltage radials and the at least one first signal constellation includes:
   determining, via the processor, at least one first point of the one or more points of the at least one first signal constellation, the at least one first point closest to a center of each coordinate bin;
   determining, via the processor, at least one of a) a third phase angle corresponding to the first calibration voltage associated with the at least one first point and b) a first pulse amplitude corresponding to the first signal constellation; and
   associating with each coordinate bin one or more of the third phase angle and the first pulse amplitude.

8. The method of claim 1, further comprising:
   receiving, via the pADC system, at least one input signal;
   imparting voltage information of the at least one input signal onto the at least one optical pulse train via the phase modulator;
   generating, via the quantization circuitry, at least one second signal constellation corresponding to the at least one input signal by demodulating the at least one phase-modulated optical pulse train;
   generating, via the processor, at least one digital output signal based on the at least one second signal constellation; and
   correcting the at least one digital output signal based on the at least one lookup table.

9. A linearized photonic ADC (pADC) sampling system, comprising:

at least one waveform generator configured to generate a calibration signal comprising a sequence of calibration voltages;

at least one optical subsystem coupled to the waveform generator, the at least one optical subsystem comprising:
an optical pulse source configured to generate at least one optical pulse train associated with a pulse amplitude; and
at least one phase modulator coupled to the optical pulse source, the phase modulator configured to impart voltage information of the at least one calibration signal onto the at least one optical pulse train;

quantizing circuitry coupled to the optical subsystem, the quantizing circuitry configured to generate at least one signal constellation in a multidimensional coordinate space by demodulating the at least one phase-modulated optical pulse train, the at least one signal constellation corresponding to the at least one calibration signal; and at least one processor coupled to the quantizing circuitry and configured to:
define one or more equivoltage radials in the coordinate space, each equivoltage radial comprising one or more points of the at least one signal constellation, the one or more points associated with at least one of a first phase angle of the phase modulator and a first calibration voltage of the sequence of calibration voltages;
generate at least one multidimensional lookup table corresponding to a coordinate system of the coordinate space by mapping the one or more of equivoltage radials to an ordered plurality of coordinate bins; and
populate the at least one multidimensional lookup table by associating, based on the one or more equivoltage radials and the at least one signal constellation, each coordinate bin of the ordered plurality of coordinate bins with one or more of the at least one pulse amplitude and the at least one first phase angle.

10. The linearized pADC sampling system of claim 9, wherein the at least one calibration signal includes a ramped voltage signal.

11. The linearized pADC sampling system of claim 9, wherein the at least one phase modulator is configured to modulate the at least one optical pulse train based on at least one second phase angle between zero and $2\pi$ radians, the second phase angle corresponding to the at least one calibration voltage.

12. The linearized pADC sampling system of claim 9, wherein the quantizing circuitry is configured to generate the at least one signal constellation in I/Q space by demodulating the at least one phase-modulated optical pulse train into at least an in-phase component and a quadrature component.

13. The linearized pADC sampling system of claim 12, wherein the quantizing circuitry comprises:
at least one first analog-digital converter (ADC) configured to digitize the at least one in-phase component; and
at least one second ADC configured to digitize the at least one quadrature component.

14. The linearized pADC sampling system of claim 9, wherein the at least one processor is configured to populate the at least one multidimensional lookup table by:

determining at least one first point of the one or more points of the at least one signal constellation, the at least one first point closest to a center of each coordinate bin;
determining at least one of:
a third phase angle corresponding to the first calibration voltage associated with the at least one first point, and
a first pulse amplitude of the at least one pulse amplitude, the first pulse amplitude corresponding to the signal constellation including the at least one first point; and
associating with each coordinate bin one or more of the third phase angle and the first pulse amplitude.

15. A receiver, comprising:
at least one waveform generator configured to generate a calibration signal comprising a sequence of calibration voltages;
at least one optical subsystem coupled to the waveform generator, the at least one optical subsystem comprising:
an optical pulse source configured to generate at least one optical pulse train associated with a pulse amplitude; and
at least one phase modulator coupled to the optical pulse source, the phase modulator configured to:
receive at least one input signal, the at least one input signal including the calibration signal; and
impart voltage information of the at least one input signal onto the at least one optical pulse train;
quantizing circuitry coupled to the optical subsystem, the quantizing circuitry configured to generate at least one signal constellation in a multidimensional coordinate space by demodulating the at least one phase-modulated optical pulse train, the at least one signal constellation corresponding to the at least one input signal; and
at least one processor coupled to the quantizing circuitry and configured to:
define one or more equivoltage radials in the coordinate space, each equivoltage radial comprising one or more points of the at least one signal constellation, the one or more points associated with at least one of a first phase angle of the phase modulator and a first calibration voltage of the sequence of calibration voltages;
generate at least one multidimensional lookup table corresponding to a coordinate system of the coordinate space by mapping the one or more of equivoltage radials to an ordered plurality of coordinate bins; and
populate the at least one multidimensional lookup table by associating, based on the one or more equivoltage radials and the at least one signal constellation, each coordinate bin of the ordered plurality of coordinate bins with one or more of the at least one pulse amplitude and the at least one first phase angle;
generate at least one digital output signal based on the at least one signal constellation; and
correct the at least one digital output signal based on the at least one multidimensional lookup table.

16. The receiver of claim 15, wherein the at least one calibration signal includes a ramped voltage signal.

17. The receiver of claim 15, wherein the at least one phase modulator is configured to modulate the at least one optical pulse train based on at least one second phase angle between zero and $2\pi$ radians, the second phase angle corresponding to the at least one calibration voltage.

18. The receiver of claim 15, wherein the quantizing circuitry is configured to generate the at least one signal constellation in I/Q space by demodulating the at least one phase-modulated optical pulse train into at least an in-phase component and a quadrature component.

19. The receiver of claim 18, wherein the quantizing circuitry comprises:
  at least one first analog-digital converter (ADC) configured to digitize the at least one in-phase component; and
  at least one second ADC configured to digitize the at least one quadrature component.

20. The receiver of claim 15, wherein the at least one processor is configured to populate the at least one multi-dimensional lookup table by:
  determining at least one first point of the one or more points of the at least one signal constellation, the at least one first point closest to a center of each coordinate bin;
  determining at least one of:
    a third phase angle corresponding to the first calibration voltage associated with the at least one first point, and
    a first pulse amplitude of the at least one pulse amplitude, the first pulse amplitude corresponding to the signal constellation including the at least one first point; and
  associating with each coordinate bin one or more of the third phase angle and the first pulse amplitude.

* * * * *